Oct. 23, 1962   G. GARNER   3,059,443
ALARM APPARATUS FOR REFRIGERATION SYSTEMS AND THE LIKE
Filed Jan. 29, 1959   2 Sheets-Sheet 1
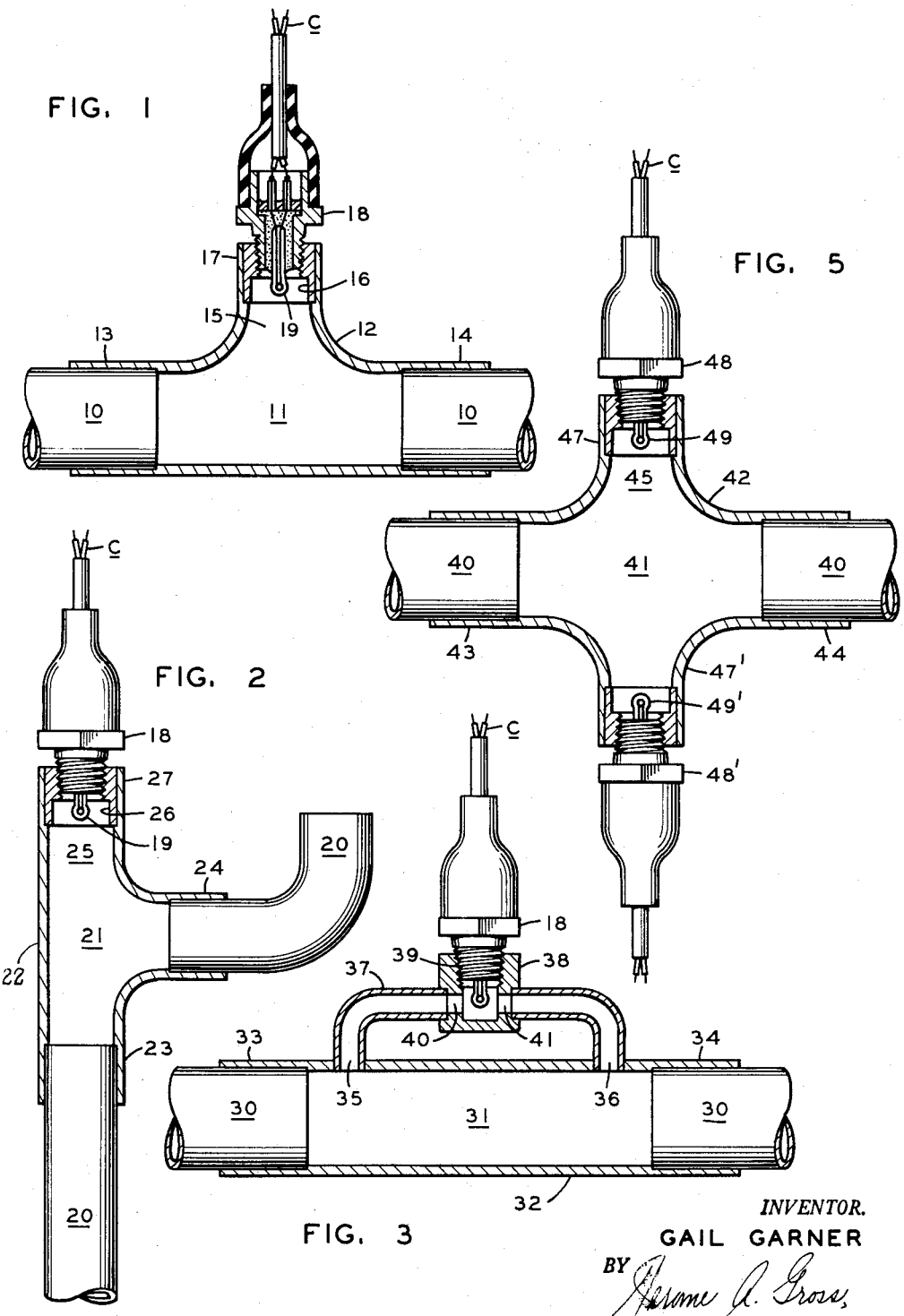
INVENTOR.
GAIL GARNER
BY Jerome A. Gross,
ATTORNEY Oct. 23, 1962 G. GARNER 3,059,443
ALARM APPARATUS FOR REFRIGERATION SYSTEMS AND THE LIKE
Filed Jan. 29, 1959 2 Sheets-Sheet 2

INVENTOR.
GAIL GARNER
BY
ATTORNEY

United States Patent Office 3,059,443
Patented Oct. 23, 1962

3,059,443
ALARM APPARATUS FOR REFRIGERATION SYSTEMS AND THE LIKE
Gail Garner, St. Louis, Mo., assignor of one-third each to Arthur Berryman and Lawrence B. Russum, both of St. Louis County, Mo.
Filed Jan. 29, 1959, Ser. No. 789,940
9 Claims. (Cl. 62—126)

This invention relates to apparatus for detecting and signaling the malfunction of refrigerating systems, air conditioning systems and the like. It is specifically directed to the prompt detection of: common service problems such as insufficient refrigerant pressure drop due to friction and bends in fluid flow lines; certain mechanical difficulties which result in the formation of gas bubbles in the fluid pressure line of the system; and certain mechanical difficulties which result in non-operation of the compressor while the thermostat or compressor motor control device is calling for refrigeration.

When the compressor in a properly operating refrigerating system is turned off, a portion of the refrigerant in the pressure line between the receiver tank and the expansion valve will vaporize as its saturation pressure is removed; but shortly after the compressor has been turned back on, the pressure should be restored and the pressure line again be filled with refrigerant in liquid form, without any entrapped bubbles. Transparent windows have sometimes been installed in the fluid pressure line of a refrigerating system to serve as a "sight glass." The presence of gas bubbles in the refrigerant may thus be detected visually; their presence may indicate an insufficiency of refrigerant, some mechanical failure or defect in installation causing the pressure to be reduced below the saturation pressure for a given temperature, or an increase in the fluid pressure line temperature without an increase in the condensing pressure. Unfortunately, such a sight glass is not self-monitoring; also, it cannot be used to detect malfunction in those cases where the increase in temperature of the refrigerant is accompanied by an increase in pressure sufficient to prevent vaporizing; nor can it be used to detect malfunctions such as a broken or badly slipping V-belt, a tripped thermal overload device, a defective motor, or other conditions which result in non-operation of the compressor while the thermostat or compressor motor control device is calling for refrigeration.

The objects of the present invention include overcoming the problems aforementioned, and detecting certain mechanical difficulties which result in formation of gas bubbles in the fluid pressure line of the system, and detecting mechanical difficulties which result in non-operation of the compressor while the thermostat or compressor motor control device is calling for refrigeration. Other objects include providing a self-monitoring alarm which will serve the functions of a sight glass in the pressure line of a refrigerant system, or other fluid flow system operating close to the saturation pressure and temperature of the fluid, and one which will also detect malfunction wherein the temperature of such a fluid is markedly raised without causing vaporization.

Another purpose includes the utilization, for purposes of signaling malfunction, of the difference in thermal conductivity and heat dissipation of flowing fluid refrigerant as compared with stagnant vapor of the refrigerant. A further object is avoiding the effects of fluctuations in applied voltage, where desired. An additional purpose is to provide for the simple installation of such apparatus in presently-existing refrigerating and like systems of equipment, to provide accurately adjustable signal-triggering circuitry therefor; and to signal non-operation of the compressor when the compressor or motor control device is calling for refrigeration.

Still further purposes will be apparent from the description hereof which follows.

These purposes are achieved, in general, by providing a raised gas-entrapment portion in the pressure line of such a system and an electrically-heated sensor responsive to heat dissipation therein, which, in the absence of entrapped gas, is cooled by the flow of the liquid refrigerant under pressure. If gas bubbles form in the pressure line they are collected and stagnate in the entrapment portion. The sensor's temperature will then rise to actuate a signalling circuit such as hereinafter described, provided the compressor or motor control device has called for refrigeration for longer than the time established by the delay circuit. The more complete description which follows hereinafter, more fully sets forth the conditions of operation.

In the accompanying drawings:

FIGURE 1 is a section view of a thermistor installed in elevated position in a T in the pressure fluid flow line of a refrigerant system, the portions of the pressure tubing in which said T is connected being shown fragmentarily.

FIGURE 2 shows an alernate installation of such a T in a fluid flow line, including a plug in the elevated end thereof for installation of a thermistor.

FIGURE 3 illustrates an alternate embodiment using an elevated by-pass tube.

FIGURE 5 shows another type of installation, being a sectional view of an X fitting incorporating two thermistors, one installed in elevated position as in FIGURE 1 and the other installed beneath the level of the flow line.

Figure 4:
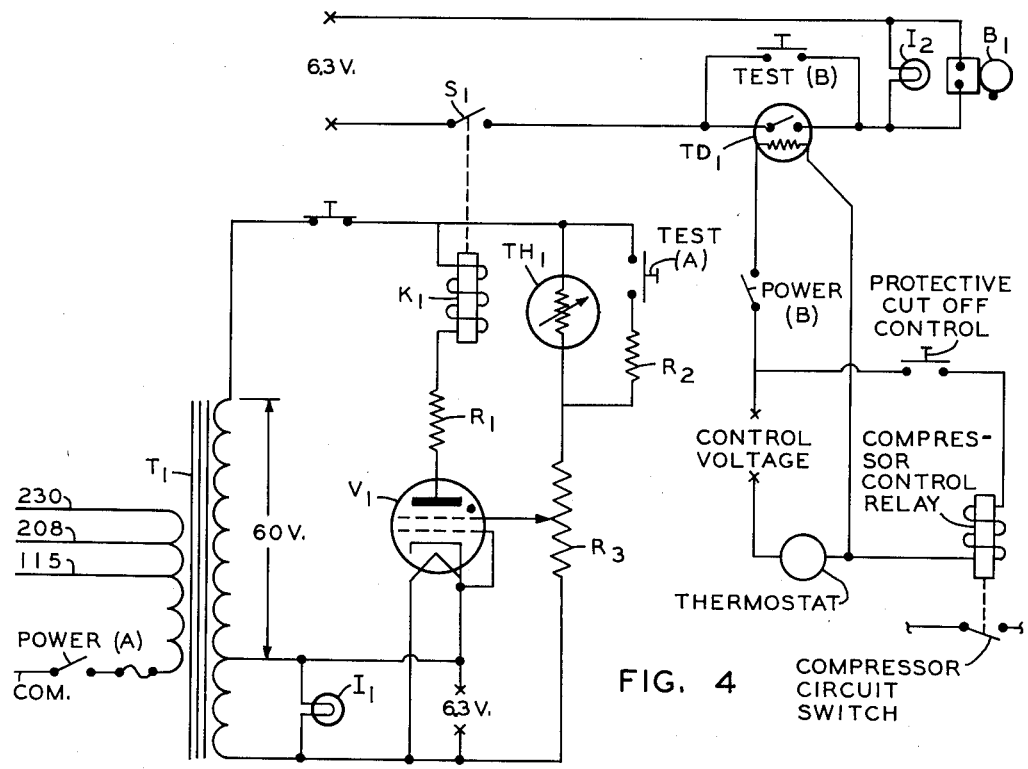
FIGURE 4 is a wiring diagram including the thermistor shown in FIGURE 1, of a circuit suitable for use with the installations of FIGURES 1, 2 or 3.

Referring now to FIGURE 1.

In the fluid pressure line designated 10 of a refrigerating system, not otherwise shown, I install a flow passage 11, which may be conveniently provided by using a conventional T coupling 12 having a flow inlet 13, a flow outlet 14 and an elevated gas bubble entrapment portion 15 located beneath a threaded adapter plug 16 sealedly installed in the branch end 17 of the T 12, the entrapment portion 15 being positioned above the level of the fluid pressure line 10.

Sealedly installed by threading into the plug 16 is a conventional thermistor 18 or similar heat-dissipation rate sensor element of the type including an electrical resistance heated by the flow of current therethrough and whose current flow varies as a function of its rate of heat dissipation. In a typical thermistor, the electrical resistance which serves the heat-dissipation-sensing function is a semi-conductor element 19 exposed for heat conductivity to the interior of the T 12 and located within the gas bubble entrapment portion 15. A flow of electrical current at a predetermined applied voltage is maintained to the thermistor 18 from a current source, not shown, by means of connectors c.

When the compressor of a refrigerating system (not shown) provides pressure to the flow line wherein the T is installed between the receiver tank and the expansion valve, the entire flow passage of the T 12 will be filled with fluid refrigerant flowing from the inlet 13 through the outlet 14. The thermistor resistance element 19 will be immersed in the flow, and cooled by it, so that its temperature will be kept cooled down to near the temperature of the refrigerant. The applied voltage chosen for the thermistor is such as would heat the resistance element 19 to a higher temperature were it not for the cooling effect of the fluid flow. Such higher temperature should not be so great as of itself to cause the fluid flowing through the passage 11 to evaporate.

If due to lack of pressure or increase of temperature, gas bubbles are permitted to form in the fluid refrigerant, they will find their way into and be collected inside the elevated gas bubble entrapment portion 15 around the resistance element 19, gradually emptying the gas bubble entrapment portion 15 of fluid refrigerant. The stagnant gas so entrapped has such a low thermal conductivity, compared to the cooling effect of flowing fluid refrigerant, that the temperature of the resistance element 19 will rise. Since current flow through the thermistor 18 varies as a direct function of temperature, the increase in temperature will be accompanied by a marked increase in current flow. This is utilized to actuate the electrical circuit shown in FIGURE 4, preferably incorporated within apparatus capable of being installed in fluid lines of refrigerating systems of varying capacities and suitable for use with both 115 volt and 230 volt alternating current.

Such current is introduced into the circuit through power (A) switch by a transformer $T_1$ which supplies the cathode voltage to a gas-filled tube $V_1$, preferably of the thyratron type. The tube shown is a four-element type, the first grid being not used and therefore having the cathode voltage connected to it. A pilot light $I_1$ is also supplied with current from the transformer $T_1$.

The second grid is biased through a variable resistance $R_3$ so chosen that, when the thermistor $Th_1$ is kept at normally cool temperature by the flow of refrigerant, the voltage of said grid does not permit any current flow through the thyratron tube $V_1$. However when the temperature of the thermistor $Th_1$ is elevated and the current flow therethrough increased, the voltage of the grid is so modified as to cause the thyratron $V_1$ to be "triggered," and current suddenly to flow therethrough subject to the current-limiting effect of the resistor $R_1$. The flow of current actuates the relay $K_1$, which closes the switch $S_1$ by which the 6.3 volt current may be supplied to the alarm light $I_2$ and alarm bell $B_1$.

In series with the relay-operated switch $S_1$ is a time delay switch $TD_1$ of the thermal-operated type. The switch $TD_1$ includes a thermocouple having a heater element, connected through the power (B) switch to a control voltage and thermostat, so that the electrical resistance element of the time delay switch $TD_1$ will be heated whenever the power (B) switch is on and the thermostat demands refrigeration. The same control voltage supplies the compressor control relay, subject to a protective cut-off control as is conventionally provided for motor overload or other purposes.

In the circuit shown in FIGURE 4, when the temperature of the thermistor $Th_1$ rises and the thyratron $V_1$ is triggered, the relay $K_1$ will be energized, closing the switch $S_1$. As long as the thermostat is off, so that the thermocouple element in the time delay switch $TD_1$ has cooled, no alarm signal will be given. After the thermostat switches on, there will be a time delay while the thermocouple of the time delay switch $TD_1$ heats sufficiently to close. In this manner, the alarms $I_2$ and $B_1$ are effectively disconnected for sufficient time to allow the pressure in the fluid pressure line 10 to build up sufficiently to dispose of any gas which may have formed therein when the compressor was off.

While I prefer to install the thermistor $Th_1$ in a substantially horizontal fluid pressure line such as the line 10 of FIGURE 1, it has also proved feasible to make such installations in a vertically rising fluid pressure line such as the line 20 of FIGURE 2. In this case a flow passage 21 is provided inward by way of the lower end inlet 23 and out by way of the branch 24 in the side of the T 22; whereas a gas bubble entrapment portion 25 is provided beneath a plug 26 in the upper end 27 of the T 22. A thermistor such as the thermistor 18, having connectors such as the connectors c may be installed sealedly within the plug 26 in the same manner as in FIGURE 1, and operated by the same circuit shown in FIGURE 4.

The "by-pass" tube trap installation shown in FIGURE 3, like the installation shown in FIGURE 1, is installed in a substantially horizontal portion of a pressure line 30. A flow passage 31 is provided in axial alignment with the pressure line 30, by means of an elongated tubular coupling element generally designated 32 having an inlet 33 and an outlet 34 connected for flow communication within the line 30. Along the upper wall of the elongated coupling 32 are two ports, a by-pass inlet port 35 and a by-pass outlet port 36, to which are connected the downwardly bent ends of a by-pass tube 37; across which is installed a thermistor well 38 having internal threads 39 which receive a thermistor 18 in the same manner as in FIGURE 1. The well 38 has a well inlet 40 and a well outlet 41. Gas collects first within the well 38 beneath the mounting threads 39. The installation of the thermistor 18 therein is as described in FIGURE 1, and the same circuit, shown in FIGURE 4, is used therewith.

All the installations so far described are sensitive not only to flash gas as described, but also increase in temperature of flowing fluid refrigerant itself, as where temperature increase may be accompanied by sufficient increase in pressure to prevent evaporation of the refrigerant. This statement does not apply to the alternate installation shown in FIGURE 5. However it, with its circuitry as shown in FIGURE 6, is sharply sensitive to the presence of gas, and besides is particularly useful where variations in the applied voltage can be anticipated and their effect should be eliminated.

The installation shown in FIGURE 5 amounts to substantially duplicating the installation of FIGURE 1 by using an X coupling 42, including both an upper branch 47 and a lower branch 47', in which a pair of thermistors 48 and 48' are respectively installed. The installation is within a fluid pressure flow line 40, by which X coupling 42 is installed with its inlet 43 and outlet 44 connected within the fluid pressure flow line 40 to provide a flow passage 41. An upper gas bubble entrapment portion 45 is provided in the upper branch 47. In the corresponding lower branch 47' which lies below the level of the line 40, there will be fluid so long as there is any fluid flow through the line 40. Using thermistors 48 of like electrical qualities and like thermal conductive qualities, the differences (not the absolute value) in the heating of the sensor elements 49, 49' respectively, can be made to signal the alarm.

Figure 6:
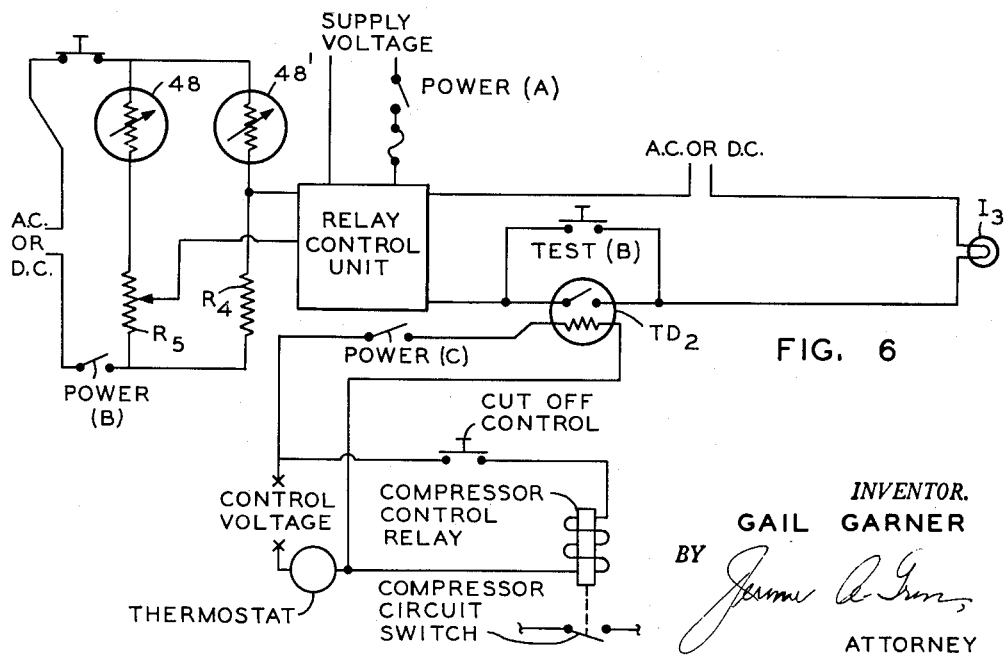
FIGURE 6 is a wiring diagram for use with the installation of FIGURE 5.

This is accomplished by the use of the bridge circuit shown in FIGURE 6. Instead of showing a thyratron tube, a relay and a relay control switch such as has been described in FIGURE 4, these elements (and others necessary to their function as will be understood by those skilled in the art) are depicted in block form by the generalized element designated "relay control unit." This unit is supplied with power through the power (A) switch; and its operation is controlled by the two thermistors 48 and 48' supplied with current through power (B) switch. The current flow is regulated by the fixed resistor $R_4$ and the variable resistor $R_5$, by which the apparatus is adjusted.

When the switch element in the relay control unit is on, it makes a series connection with the alarm light $I_3$ which is energized provided the time delay relay $TD_2$ closes the circuit. The time delay relay $TD_2$ includes a thermocouple element supplied at the demand of a thermostat with a control voltage through power (C) switch, in the same manner as has been described for FIGURE 4.

In both FIGURES 4 and 6, familiar test circuits are provided, which do not constitute this invention, and are therefore not described in detail. The "reset" switches shown in both FIGURES 4 and 6 are provided for dissipating and removing gas, collected around the thermistor, in those rare cases when the refrigeration system is operating at only slightly above the saturation pressure. Holding down the "reset" switch will cut off current from the thermistor whose heat may tend to maintain the vaporized refrigerant near it in the gaseous phase. The discontinuance of heat to the thermistor while the "reset" switch is depressed, enables the collected gas to go back into liquid phase. However, this condition will seldom be encountered because the thermistor dissipates an extremely small amount of energy, roughly 1/8 watt, more or less. Instead of the use of thyratron or other electron tubes, the increase in current flow through the thermistor or thermistors may be utilized to "trigger" other electrical circuits. For example, a transistorized circuit may be used. In the claims, the terms "electron emitter, electron collector, and bias" are applicable to the cathodes plate and grid of an electron tube circuit as well as to a transistorized circuit.

Various modifications of the forms of flow, passages, gas bubble entrapment portions, and elements in circuitry, will be obvious to those skilled in the art. Various other uses will suggest themselves to persons familiar with the problems of the art. Accordingly, the claims are not to be construed narrowly, but instead to be given a breadth of scope fully coextensive with the terms thereof.

I claim:

1. Apparatus for indicating malfunction in the fluid flow system of refrigeration equipment and the like, comprising a T installable in a refrigerant fluid pressure line of such system and having a flow inlet, a flow outlet, and a portion elevated thereabove, a thermistor sealedly installed in said portion and exposed to the interior of said T, said thermistor including a resistance, means for applying a voltage to said thermistor whereby to maintain its resistance within a temperature range above the range of temperature of refrigerant fluid in such pressure line, and electric signal-triggering means to signal an alarm in response to diminution in the thermistor's rate of heat dissipation.

2. Apparatus as defined in claim 1, the signal-triggering means including a gas-filled electron tube having a grid controlled by the thermistor.

3. An electrical alarm for installation in the pressure line of refrigerating equipment and the like, comprising a tubular coupling having an inlet and outlet whereby a refrigerant pressure line flow passage is defined, further having a gas trap portion elevated within the flow passage whereby to catch and collect gas bubbles rising in liquid refrigerant flowing under pressure through the coupling, an electrically-heated sensor of the type responsive to rate of heat dissipation so installed within the gas trap portion as to be immersed in and cooled by flowing liquid refrigerant passing through the coupling under pressure in the absence of collected gas, a source of electrical current connected thereto whereby to heat the sensor, an electrical alarm, and means to signal said alarm in response to change in the sensor's rate of heat dissipation.

4. The electrical alarm defined in claim 3, the sensor being a thermistor.

5. An electrical alarm for signalling malfunction of refrigeration equipment of the type having a compressor motor and an automatic control therefor, comprising a portion of the refrigerant flow system at the pressure side of the compressor, said portion having a sealed elevated part, a thermistor mounted in said elevated part, an electrical alarm, means to signal said alarm in response to diminution of the thermistor's rate of heat dissipation, means to de-activate said signal means whenever the compressor control calls for no compressor operation, and means to continue such de-activation for a predetermined time after the compressor control again calls for compressor operation.

6. A new article of commerce for connection within the pressure line of a refrigerating system, comprising a tubular flow passage having an inlet and outlet and gas-entrapment means in an elevated position within the flow passage whereby to catch and collect gas bubbles rising in liquid refrigerant flowing under pressure through the flow passage, a thermistor in the gas-entrapment means so installed as to be immersed in flowing liquid refrigerant passing through the flow passage under pressure in the absence of collected gas, said means being closed to fluid flow above the level of the thermistor, and means to signal a diminution in the thermistor's rate of heat dissipation.

7. A new article of commerce, for connection within the pressure line of a refrigerating system, comprising a flow passage having an inlet end and an outlet end, a by-pass tube of lesser diameter than the flow passage and elevated above the flow passage, the by-pass tube having a by-pass inlet joining the flow passage near its inlet end and a by-pass outlet joining the flow passage near its outlet end, a thermistor mounted within the by-pass tube, and means to signal diminution in the thermistor's rate of heat dissipation.

8. A new article of commerce, for connection within the pressure line of a refrigerating system, comprising an X-shaped coupling having an inlet, an outlet, an internal portion elevated above the inlet and outlet, and an internal portion at a lower level than the inlet and outlet, a thermistor within the elevated portion, said elevated portion being sealed above the level of the thermistor, a second thermistor in the lower level portion, said portion being sealed below the level of the thermistor, and means to signal diminution in the rate of heat dissipation of said first thermistor as compared with said second thermistor.

9. An electrical alarm for installation in the pressure line of refrigerating equipment and the like, comprising a coupling having an inlet and outlet whereby a flow passage is defined, further having a gas trap elevated within the flow passage, an electrically-heated sensor of the type responsive to rate of heat dissipation, a source of electrical current connected thereto whereby to heat the sensor, an electrical alarm, and means to signal said alarm in response to change in the sensor's rate of heat dissipation, said means having an electron emitter, an electron collector, and a bias controlled by the said sensor.

References Cited in the file of this patent

UNITED STATES PATENTS

| | | |
|---|---|---|
| 2,054,542 | Hoelle | Sept. 15, 1936 |
| 2,624,181 | Erwin | Jan. 6, 1953 |
| 2,757,362 | Gutkowski | July 31, 1956 |
| 2,769,121 | Rogoff | Oct. 30, 1956 |
| 2,777,640 | Kaufman | Jan. 15, 1957 |
| 2,824,278 | Johnston | Feb. 17, 1958 |
| 2,863,299 | Ammons | Dec. 9, 1958 |
| 2,924,234 | Wilson | Feb. 9, 1960 |
| 2,926,299 | Rogoff | Feb. 23, 1960 |
| 2,928,037 | Lawrence | Mar. 8, 1960 |